United States Patent
Beardmore

(10) Patent No.: US 9,545,674 B2
(45) Date of Patent: Jan. 17, 2017

(54) BUSHING FOR DRILL TEMPLATE

(71) Applicant: Rob Beardmore, Bloomfield Hills, MI (US)

(72) Inventor: Rob Beardmore, Bloomfield Hills, MI (US)

(73) Assignee: Harcourt Industrial, Inc., Madison Heights, MI (US)

( * ) Notice: Subject to any disclaimer, the term of this patent is extended or adjusted under 35 U.S.C. 154(b) by 0 days.

(21) Appl. No.: 14/736,385

(22) Filed: Jun. 11, 2015

(65) Prior Publication Data

US 2015/0360299 A1 Dec. 17, 2015

Related U.S. Application Data

(60) Provisional application No. 62/012,368, filed on Jun. 15, 2014.

(51) Int. Cl.
*B23B 49/02* (2006.01)

(52) U.S. Cl.
CPC .............. *B23B 49/023* (2013.01); *B23B 49/02* (2013.01); *B23B 2247/12* (2013.01); *B23B 2260/09* (2013.01); *B23B 2260/138* (2013.01); *Y10T 408/568* (2015.01); *Y10T 408/97* (2015.01)

(58) Field of Classification Search
CPC ...... B23B 49/02; B23B 49/023; B23B 49/008; B23B 2215/04; B23B 2247/12
See application file for complete search history.

(56) References Cited

U.S. PATENT DOCUMENTS

| | | | | |
|---|---|---|---|---|
| 2,409,160 A | * | 10/1946 | Sirp ........................ | B23B 47/28 269/232 |
| 2,698,547 A | * | 1/1955 | Armacost .............. | B22D 19/00 408/241 R |
| 3,048,061 A | * | 8/1962 | Mele ..................... | B23B 49/023 384/192 |
| 3,336,822 A | * | 8/1967 | Armacost ............. | B23B 49/023 408/241 R |
| 3,575,519 A | * | 4/1971 | Bruner .................... | B23B 49/02 408/116 |
| 3,708,237 A | * | 1/1973 | Kruse ................... | B23B 47/288 408/108 |
| 3,756,736 A | * | 9/1973 | Marcoux ............... | B23B 49/023 408/14 |
| 4,213,658 A | * | 7/1980 | Shaw .................... | B23B 49/023 384/247 |
| 4,507,026 A | * | 3/1985 | Lund ..................... | B23B 49/008 408/14 |

(Continued)

*Primary Examiner* — Daniel Howell
*Assistant Examiner* — Chwen-Wei Su
(74) *Attorney, Agent, or Firm* — Dickinson Wright PLLC

(57) ABSTRACT

A bushing for a drill template, the bushing has a head portion for receipt of a drill motor. The head portion has a top surface and a bottom surface with at least one pin protruding from the bottom surface of the head portion. The pin fits within a secondary opening in a template to help retain the bushing in place. A body portion extends from the bottom surface of the head portion. The body portion has an outer surface with a portion of it threaded. The body portion extends through a primary drill hole in the template. A fastening nut having inner threads mates with the outer threads on the body portion to lock the bushing to the template. A bore extends through the head portion and the body portion for receipt of a drill bit.

12 Claims, 4 Drawing Sheets

(56) References Cited

U.S. PATENT DOCUMENTS

| | | | | |
|---|---|---|---|---|
| 4,770,570 A | * | 9/1988 | Tsui | B23B 49/02 |
| | | | | 408/115 B |
| 5,088,171 A | * | 2/1992 | Suzuki | B23B 49/02 |
| | | | | 29/26 A |
| 2003/0049085 A1 | * | 3/2003 | Pettersson | B23B 49/02 |
| | | | | 409/132 |
| 2010/0040426 A1 | * | 2/2010 | Pettersson | B23B 31/1071 |
| | | | | 408/115 B |
| 2012/0009032 A1 | * | 1/2012 | Grussenmeyer | B23B 51/0426 |
| | | | | 408/204 |

\* cited by examiner

BUSHING FOR DRILL TEMPLATE

RELATED APPLICATIONS

This application claims the benefit of U.S. Provisional Application No. 62/012,368 filed on Jun. 15, 2014, of which is hereby incorporated by reference.

STATEMENT REGARDING FEDERALLY SPONSORED RESEARCH

NONE

TECHNICAL FIELD

This invention relates generally to bushings. And more particularly to bushings for use as drill guides for templates.

BACKGROUND OF THE INVENTION

Templates are used in many industries to provide an easy method for repetitive activities. For example, a template can be used to repetitively locate the position of holes that need to be drilled in a surface. The template is formed to fit over the surface in a particular position and has holes preformed in the template that will automatically locate the position where holes need to be drilled. A drill bit can then be positioned in the holes in the template to drill the holes at the desired locations in the surface. The template removes the need to measure all the desired locations of the holes in the surface. Once the template is positioned on the surface, the location of the holes in the underlying surface is automatically determined.

To prevent unnecessary wear of the template, bushings have been used. The bushings are configured to mount within the holes in the template and accept a drill bit. The bushings are normally made of metal and have an outside diameter generally equal to or slightly greater than the diameter of the template hole. The bushings prevent the drill bit from contacting the template. As will be appreciated, if the drill bit contacted the template, the hole would be distorted and the template would not be acceptable for further use.

The problem with known bushings is that they can spin within the template openings, push through the template, or be removed from the template when the drill bit is removed. Any of these have the potential for damaging the template and preventing its additional use. Even if the template is not damaged, the time involved in re-installing the bushings is undesirable.

This has been found to be a big problem in industrial applications, particularly for example in the aerospace industry. Large templates with numerous guide holes are used to drill holes in for example wing parts. With numerous guide holes having numerous bushings, any single bushing can push through, rotate, etc. This will result in down time to repair that bushing, or if the failure is severe enough to repair the template. Since there are a large number of bushings that can potentially fail, any number could fail at different times, requiring repeated repairs and long cumulative downtimes.

What is needed is a bushing that is fixed within the template and does not rotate, spin, pull through or push through.

DETAILED DESCRIPTION OF A PREFERRED EMBODIMENT

Figure 1:
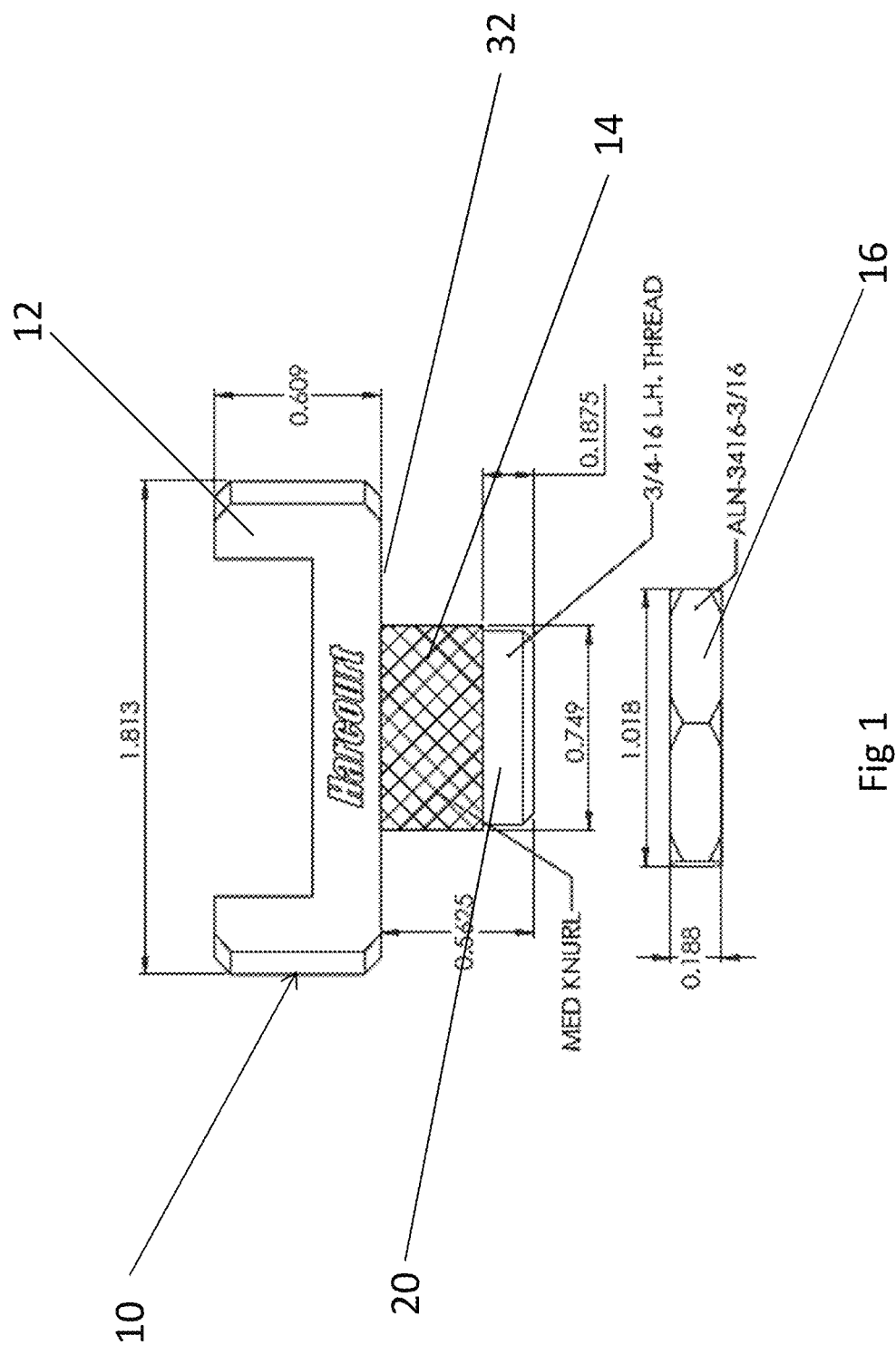
FIG. 1 is a front view of the bushing of the present invention.

The bushing of the present invention is shown generally at 10 in FIG. 1. The bushing 10 includes a head 12, a body 14 and a fastener 16. The head 12 and body 14 are made of metal and in the disclosed embodiment are integrally formed. In the disclosed embodiment, the head 12 and body 14 are machined from a single piece of metal. In the disclosed embodiment, the fastener 16 is a nut, preferably a left handed thread that threads upon threads 20 on the body 14. Fastener 16 is also made of metal in the disclosed embodiment.

Figure 2:
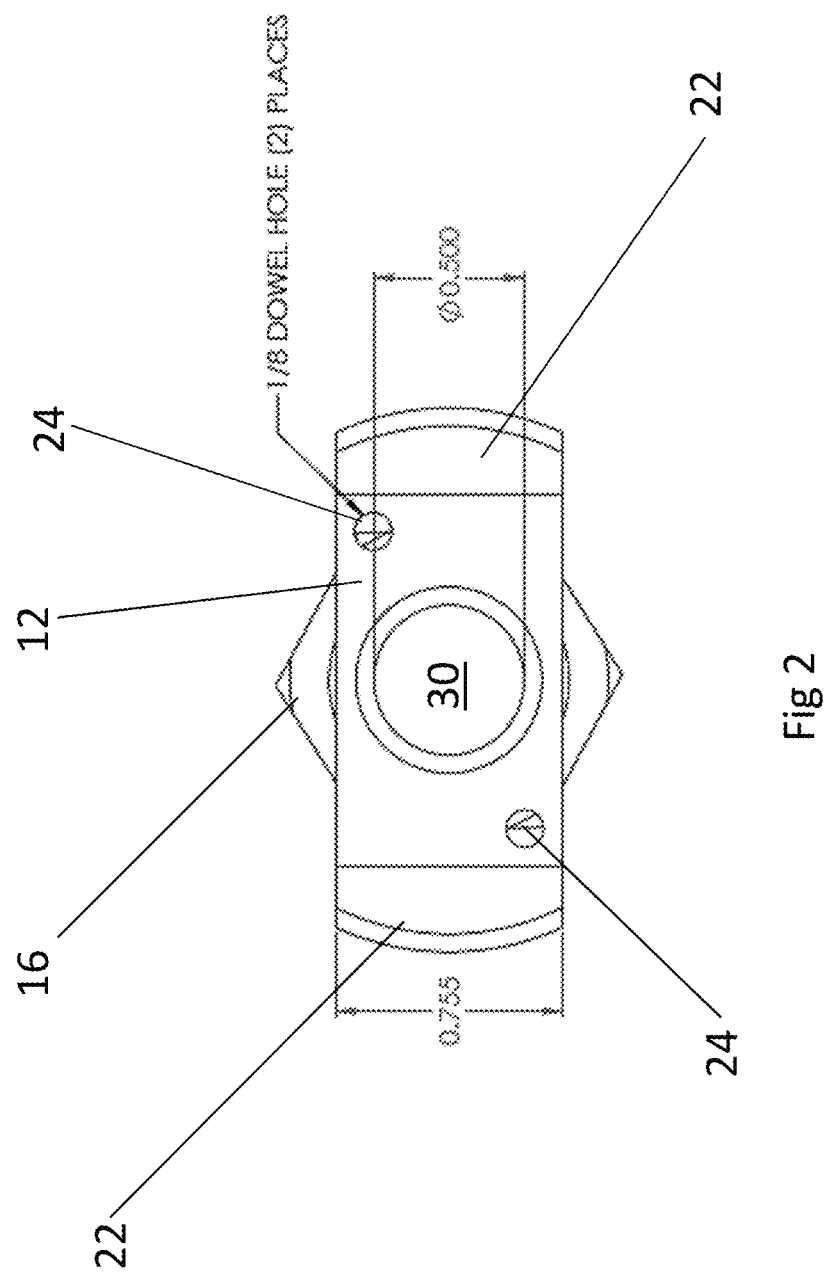
FIG. 2 is a bottom view of the bushing of the present invention.
Figure 3:
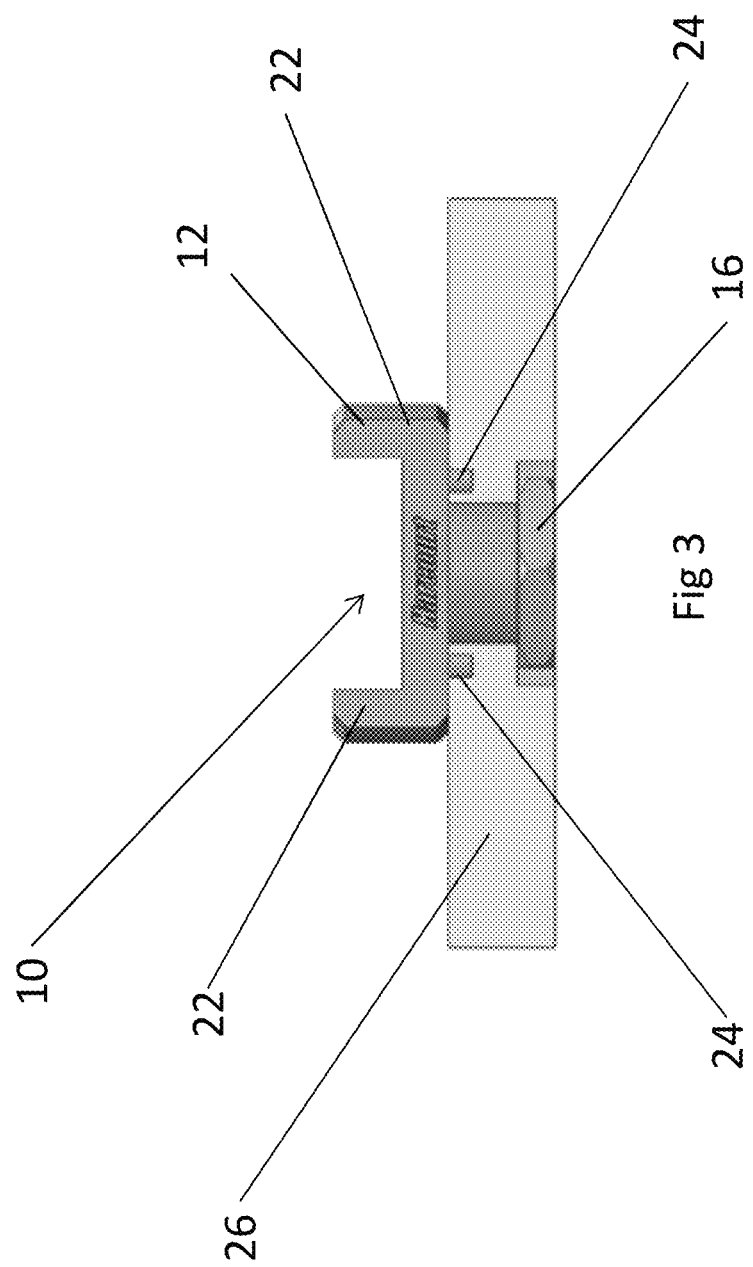
FIG. 3 is a partial cutaway view of the bushing of the present invention installed in a template.
Figure 4:
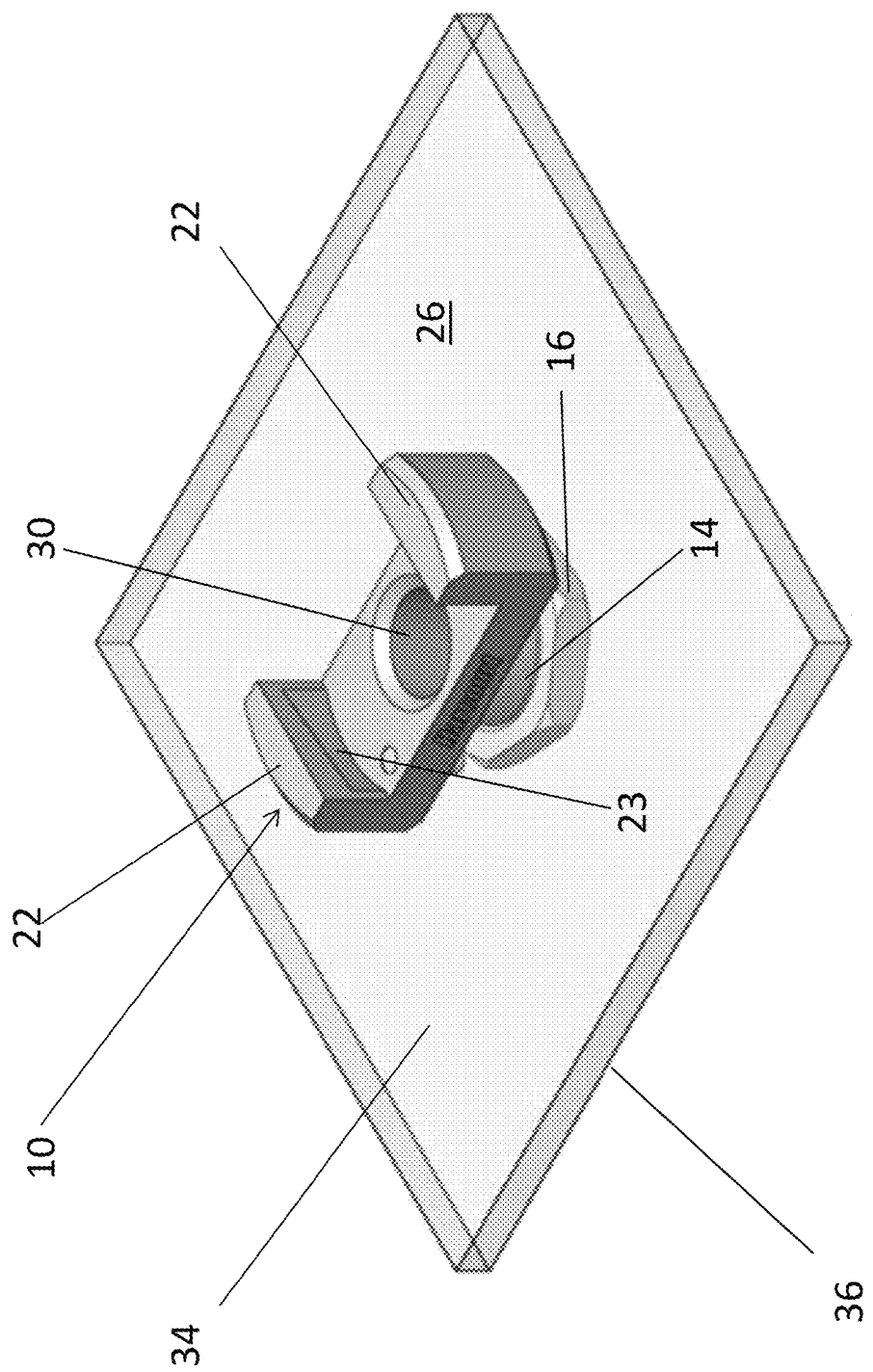
FIG. 4 is a perspective view of the bushing of the present invention installed in a template.

With reference to FIG. 2, dowel pins 24 are shown. The dowel pins 24 protrude from the bottom of the head 12 for receipt within corresponding holes in the template 26, (see FIG. 3). The dowel pins 24 prevent the bushing 10 from rotating when the fastener 16 is threaded upon the body 14. As shown in FIG. 3, the template can have a pocket 28 for receipt of the fastener 16.

The head 12 has raised locking tabs 22 that form a recess 24 for receipt of a drill head with a drill bit that extends through the central hole or bore 30. As will be known to those of ordinary skill in the art, an air feed tip can be used on the drill to properly position and hold the drill motor. In the disclosed embodiment, the locking tabs 22 have 6° ramps 23 to give a positive lock with the air feed tip and control vibration.

In use, the bushing 10 is mounted within a preformed hole in the template 26. The body 14 has knurling to frictionally engage the walls of the hole in the template 26. Additionally, an adhesive can be applied to the body 14 to further prevent movement of the body 14 with respect to the template 26. Dowels 24 are positioned in openings in the template 26. The dowels 24 interact with the openings in the template 26 to stabilize the bushing 10 with respect to the template 26. The fastener 16 is then treaded upon the exterior threads on the body 14 to fasten the bushing 10 with respect to the template 26.

The head 12 has a bottom surface 32 which together with the fastener 16 sandwiches the template top surface 34 and bottom surface 36. Due to the interaction of the pins 24 and the sandwiching of the template 26 between the bottom surface 32 of head 12 and fastener 16, the bushing will not rotate, spin, push through or pull out of the template 26.

Once the bushings 10 are fastened to the template 26, the template 26 can be positioned upon a surface to be drilled. A drill can be attached to the head 12 with the drill bit extending into the opening 30. The opening 30 guides the drill bit as the drill bit forms a hole in the underling surface.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A bushing for a drill template, said bushing comprising:
a head portion for receipt of a drill motor, said head portion having a top surface and a bottom surface;
at least one pin protruding from said bottom surface of said head portion;
a body portion extending from said bottom surface of said head portion, said body portion having an outer surface, a portion of said outer surface having outer threads;
a fastening nut having inner threads, said inner threads mating with said outer threads on said body portion;
a bore extending through said head portion and said body portion;
whereby said body portion is adapted to be inserted into a first opening formed in a template, with said at least one pin being received within a second opening formed in the template, said second opening being adjacent said first opening, said pin resisting rotation of said bushing with respect the template, said bottom surface of said head portion engaging the template, said bushing being retained within said template by threading said nut onto said external threads on said body portion.

2. The bushing of claim 1, wherein said top surface of said head portion includes a mating surface to engage a drill head.

3. The bushing of claim 2, wherein said a mating surface includes at least two raised locking tabs that define a recess for receipt of a drill head.

4. The bushing of claim 3, wherein said locking tabs have inclined surfaces to engage the drill head to positively lock the drill head with respect to said locking tabs.

5. The bushing of claim 1, wherein said outer surface of said body portion has knurling to frictionally engage with the inner diameter of a hole in a template.

6. The bushing of claim 1, wherein said head portion and said body portion are integral.

7. A bushing and drill template comprising:
a template having at least one primary drill opening having an inner diameter and a secondary opening, said template being adapted to engage a work piece to properly and repeatedly form at least one hole in the work piece;
a bushing mounted in said at least one primary opening to protect said primary opening from drilling operations, said bushing have a head portion for receipt of a drill head, said head portion having a top surface and a bottom surface; at least one pin protruding from said bottom surface of said head portion; said at least one pin engaging said secondary opening to resist rotation of said bushing with respect to said template;
a body portion extending from said bottom surface of said head portion, said body portion having an outer surface, a portion of said outer surface having outer threads; said outer surface having an outer diameter slightly less than said inner diameter of said primary drill opening in said template, said body portion being inserted into said primary drill opening;
a fastening nut having inner threads, said inner threads mating with said outer threads on said body portion; said template having a recess coaxial with said primary opening, said recess receiving said fastening nut; said fastening nut fastening said bushing onto said template;
a bore extending through said head portion and said body portion;
whereby said template is positioned against a work piece and a drill head is engaged with said bushing head, said drill head includes a drill bit which is received within said bore, the drill bit extends through said bore and engages said work piece to form a desired hole in the work piece.

8. The bushing of claim 7, wherein said top surface of said head portion includes a mating surface to engage a drill head.

9. The bushing of claim 8, wherein said a mating surface includes at least two raised locking tabs that define a recess for receipt of a drill head.

10. The bushing of claim 9, wherein said locking tabs have inclined surfaces to engage the drill head to positively lock the drill head with respect to said locking tabs.

11. The bushing of claim 7, wherein said outer surface of said body portion has knurling to frictionally engage with the inner diameter of a hole in a template.

12. The bushing of claim 7, wherein said head portion and said body portion are integral.

* * * * *